United States Patent [19]
Bobo et al.

[11] 3,815,868
[45] June 11, 1974

[54] GATE VALVE

[75] Inventors: Gerald Bobo, Waverly; James H. Hipple, Piketon, both of Ohio; Edward M. Petrosky, Latrobe, Pa.

[73] Assignee: The United States of America, as represented by the United States Atomic Energy Commission, Washington, D.C.

[22] Filed: June 6, 1973

[21] Appl. No.: 367,681

[52] U.S. Cl................................. 251/86, 251/167
[51] Int. Cl. ............................................. F16k 3/04
[58] Field of Search ......... 251/86, 87, 88, 167, 168, 251/197, 198, 199, 200

[56] References Cited
UNITED STATES PATENTS
2,520,364  8/1950  Hobbs .............................. 251/167
2,868,495  1/1959  Lucas .................................. 251/86

*Primary Examiner*—Harold W. Weakley
*Attorney, Agent, or Firm*—John A. Horan; David S. Zachry; Fred O. Lewis

[57] ABSTRACT

A double-disc gate valve of the kind wherein rotatable valve discs are lowered to a selected position within a casing and then moved transversely outward to close inlet and outlet ports of the valve. In some applications of such valves, the process fluid differential pressure skews the downstream disc assembly during opening of the valve. To eliminate resulting undesirable effects, the downstream disc of the present valve is provided with a pair of oppositely disposed, laterally projecting arms which during transverse movement of the disc are engaged by hold-down lugs in the casing. If, because of skewing, one of the disc arms is still engaged by its hold-down lug at a time when the valve discs are being lifted, the resulting rotational force applied to the downstream disc causes it to rotate, freeing the downstream assembly.

7 Claims, 5 Drawing Figures

PATENTED JUN 11 1974 3,815,868
SHEET 1 OF 2
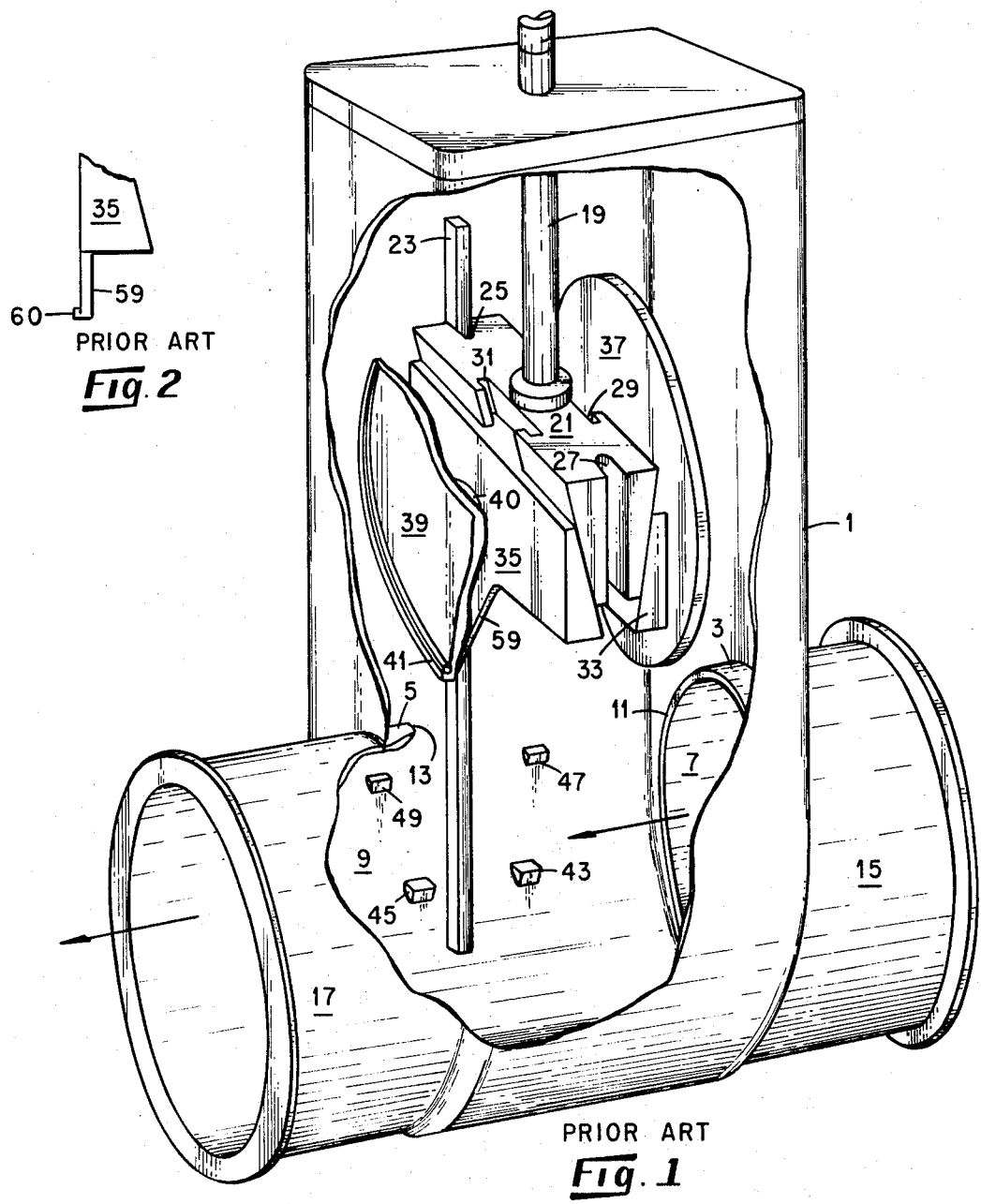
PRIOR ART
Fig. 2
PRIOR ART
Fig. 1

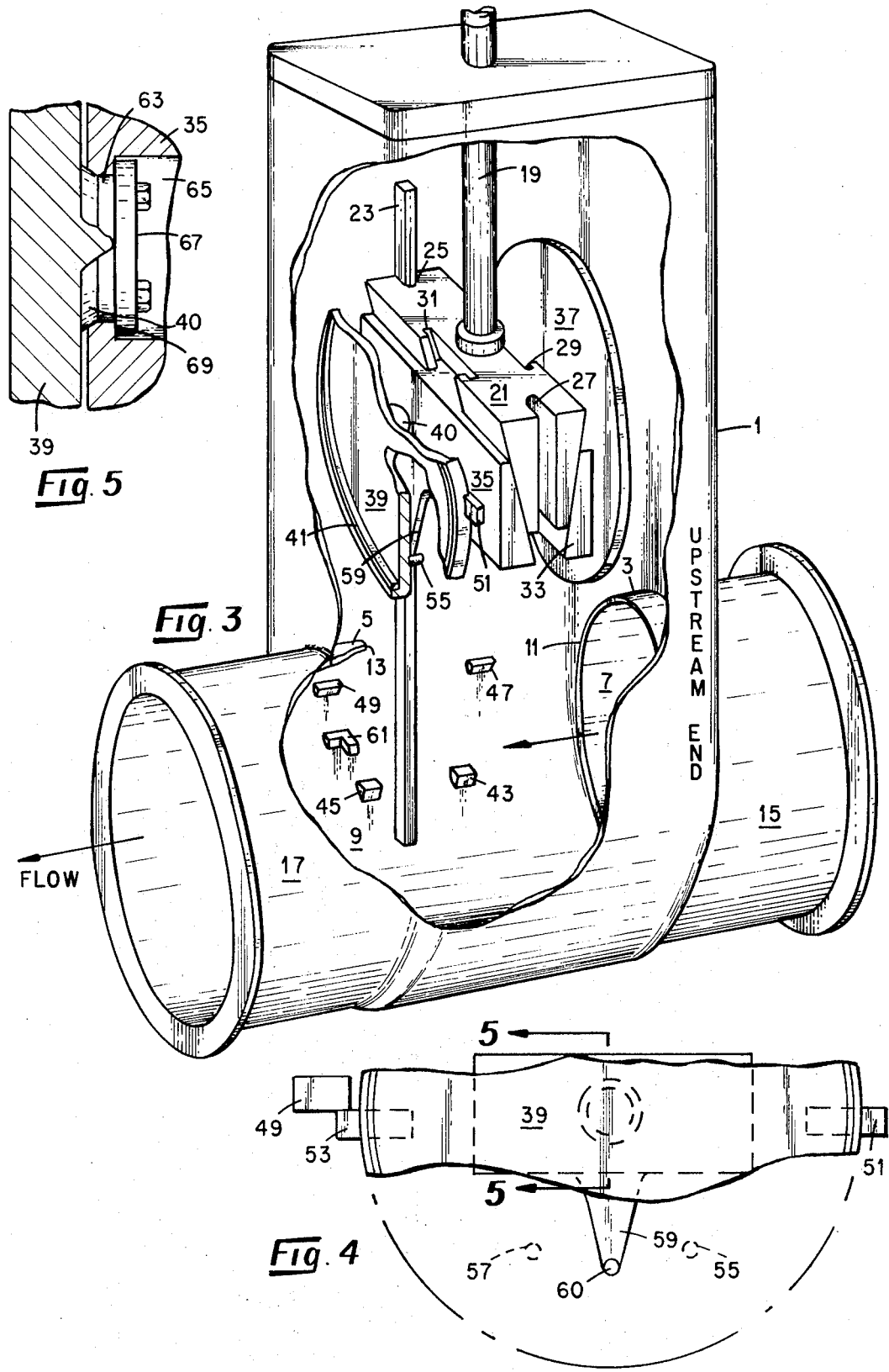

GATE VALVE

BACKGROUND OF THE INVENTION

This invention relates generally to gate valves and more particularly to such valves wherein a pair of valve discs is moved along an axis to a position between a pair of seat bodies and then moved transversely outward from said axis to close inlet and outlet ports of the valve.

This invention was made in the course of, or under, a contract with the United States Atomic Energy Commission.

FIG. 1 is a perspective view of a double-disc gate valve designed generally in accordance with the teachings of U.S. Pat. No. 2,520,364, to Hobbs. Referring to FIG. 1, the double-disc valve includes an elongated valve body, or casing, 1 whose lower portion encloses tubular seat bodies 3 and 5. The bodies 3 and 5, which respectively define valve ports 7 and 9, terminate respectively in opposed annular seating surfaces 11 and 13. As shown, process pipes 15 and 17 are respectively connected to the valve ports. Extending through the top portion of the casing 1 is a stem 19 whose external end is connected to a suitable operator means for raising and lowering the stem and whose lower end is threaded into a wedge-shaped body 21. The wedge is disposed tranversely of the stem and is positioned with its thinner edge downward. The ends of the wedge are provided with grooves 25 and 27 for slidably engaging longitudinally extending, opposed guide rails 23 on the casing, only one of these rails being in view of FIG. 1. As shown, the sides of the wedge 21 are provided with upwardly extending grooves 29 and 31 for slidably retaining disc-spreaders 33 and 35, respectively, as by means of dove-tail joints. The spreaders are wedge-shaped and are disposed with their thinner edges upward; thus, longitudinal movement of the wedge relative to the spreaders moves the latter transversely in the casing. Valve discs 37 and 39 are rotatably mounted to the spreaders 33 and 35, respectively, and are positioned outwardly thereof. Each disc is provided with a central extension 40 for connection to its associated spreader. Each of the spreaders is formed with a central, downwardly extending tongue 59 having a lateral projection 60 (FIG. 2) which extends close to the face of the associated valve disc to limit tilting of the latter from the vertical plane. The outer face of each disc is provided with an annular surface 41 (one of which is in view in FIG. 1) for sealably engaging one of the seating surfaces 11, 13.

Closing of the valve of FIG. 1 is effected by downward movement of the stem 19. The resulting downward movement of the gate assembly (wedge-spreader-disc assemblies) is guided by the rails 23. Mounted on the casing are pairs 43 and 45 of opposed stops, one stop of each pair being in view in FIG. 1. The pairs 43, 45 are positioned to intercept both ends of the spreaders 33 and 35, respectively, when the gate assembly is lowered to a position where the valve discs are substantially aligned with the seating surfaces 11, 13. Continued downward movement of the stem 19 and wedge 21 forces the disc-and-spreader assemblies transversely outward, moving the spreaders 33 and 35 immediately beneath pairs of opposed hold-down lugs 47 and 49, respectively, on the casing and moving the discs 37 and 39 into sealing engagement with the seating surfaces 11 and 13, respectively, to close the valve. In FIG. 1, one member of each pair of the holddown lugs is in view.

In opening the valve, initial upward movement of the stem 19 lifts the wedge 21 relative to the spreader-and-disc assemblies, transversely retracting the same. Upward movement of these spreader-and-disc assemblies during disengagement of the discs is prevented by the pair of lugs 47 holding down the spreader 33 and by the pair of lugs 49 holding down the spreader 35; such movement might mar the engaged sealing surfaces. Continued upward movement of the stem 19 transversely retracts the spreaders from under their respective hold-down lugs and ultimately returns the gate assembly to the position shown.

It has been found that valves of this kind shown in FIG. 1 are subject to malfunction or failure when subjected to comparatively high process stream differential pressures. That is, during opening of the valve the pressure exerted by the process stream assists retraction of the upstream spreader-and-disc assembly but opposes retraction of the corresponding downstream assembly. Furthermore, because of the necessary clearances and tolerances of the valve components, the stream pressure on the down-stream assembly sometimes causes the downstream spreader to skew (rotate slightly) in the horizontal plane. As a result, sometimes that spreader is still engaged with one or the other of its hold-down lugs at a time when the remainder of the gate assembly is free to move upward. In that event, continued upward movement of the wedge 21 exerts severe rotational forces on the dove-tail joint between the wedge and the downstream spreader, causing jamming or breakage. Such valve failure can be costly as, for example, in gaseous diffusion plants for the separation of uranium isotopes. In such plants a high penalty attends equipment downtime; furthermore, valve repair of replacement costs are high because the valves are large, many of them having discs nearly four feet in diameter.

SUMMARY OF THE INVENTION

Accordingly, it is an object of this invention to provide a double-disc gate valve of improved design.

It is another object to provide a double-disc valve which operates reliably in systems where the valve is subjected to comparatively high differential pressures.

It is another object to provide a double-disc gate valve whose downstream valve disc is of novel design.

Other objects will be made apparent hereinafter.

This invention can be summarized as follows:

In a gate valve including an elongated casing enclosing opposed annular seating surfaces defining an upstream port and a downstream port, a gate assembly movable longitudinally in said casing, said assembly including a pair of valve discs having surfaces for engaging said seating surfaces to close said valve, a pair of spreaders rotatably supporting said discs, and a wedge slidably engaging and carrying said spreaders; means for longitudinally moving said assembly to a position where said discs are between and substantially aligned with said seating surfaces and for transversely moving the disc-and-spreader assemblies so positioned to close and open said ports; and upstream and downstream pairs of hold-down lugs in said member for respectively engaging the upstream and downstream disc-and-spreader assemblies to restrict sliding of said disc surfaces across said seating surfaces during opening of said valve; the improvement comprising a pair of oppositely disposed, laterally projecting arms carried by the downstream valve disc, for engagement with the downstream pair of said hold-down lugs during transverse movement of said downstream disc to said position, whereby longitudinal movement of said gate assembly when only one of said arms has disengaged from its hold-down lug effects angular displacement of said downsteam disc.

BRIEF DESCRIPTION OF THE DRAWINGS

FIG. 1 is a perspective view of a double-disc gate valve in the prior art;

FIG. 2 is an end view of a spreader 35 shown in FIG. 1;

FIG. 3 is a perspective view of the valve of FIG. 1 as modified in accordance with this invention;

FIG. 4 is a front elevation of a downstream disc-and-spreader assembly shown in FIG. 3, parts of the disc being cut away and associated pats of the assembly being shown in phantom; and FIG. 5 is a sectional view taken along lines 5-5 of FIG. 4.

DESCRIPTION OF THE PREFERRED EMBODIMENT

This invention is illustrated below as employed in the double-disc gate valve shown in FIGS. 1 and 2. Referring to FIGS. 3-5, the valve of FIG. 1 has been modified as follows in accordance with this invention: a pair of arms 51 and 53 and a pair of bosses 55 and 57 have been provided on the valve disc 39; the pair of hold-down lugs 49 has been re-positioned; and a pair of disc-arm stops 61 has been provided in the casing. Conforming with the direction of the process fluid flow shown in FIG. 3, the following description refers to the disc 39, spreader 35, and lugs 49 as the downstream disc, spreader, and lugs.

As shown in FIGS. 3 and 4, the downstream valve disc 39 is provided with a pair of opposed and laterally extending arms 51 and 53. These are positioned for engagement by the hold-down lugs 49 as the valve is opened. That is, during disengagement of the disc 39 from its associated seating surface 13, the lugs 49 engage the arms to restrict upward movement and ensure transverse retraction of the downstream disc-and-spreader assembly. Thus, the arms and hold-down lugs cooperate to minimize sliding of the disc across the seating surface 13. To serve this function, the lugs are positioned in the casing to extend immediately above the respective disc arms when the valve is completely closed.

If, during opening of the valve, the process stream pressure causes skewing of the spreader as described, one of the arms 51, 53 may still be engaged by its hold-down lug 49 when the other components of the gate assembly are free to move upward. In this event, continued upward movement of the stem 19 does not impart rotational stresses to the wedge-spreader dove-tail joint, as in the valve of FIG. 1. Rather, the rotational forces are applied to the disc 39 via the held-down disc-arm, with the result that the disc rotates, permitting that arm to disengage from its hold-down lug. As a specific example, assume that during opening of the valve the downstream disc 39, as viewed in FIG. 4, is skewed to a position where the disc arm 53 remains engaged with its hold-down lug 49, the other arm 51 having been retracted from under its lug. Continued upward movement of the stem 19 then will cause the disc 39 to rotate counterclockwise, permitting the arm 53 to slide upward past the lug 49. This eliminates the jamming or breakage previously described. On the other hand, should skewing cause the disc arm 51 to remain engaged with its hold-down lug after the arm 53 has cleared its lug, continued upward movement of the stem will result in clockwise rotation of the disc 39.

If, during opening of the valve, the disc 39 is rotated in either direction as just described, the disc no longer is in proper orientation for closing of the valve--i.e., the disc-arms 51 and 53 are not in position to move immediately under their respective hold-down lugs 49. Accordingly, opposed disc-arm blocks 61 (FIG. 3) are provided in the casing to intercept the disc arms as the gate assembly is lowered to the position where the valve discs are aligned with the seating surfaces 11 and 13, thus re-orienting the disc 39 to the "normal" position shown in FIG. 4. The disc-arms now are in position to slide under the hold-down lugs 49. As indicated in FIG. 3, the disc-arm blocks 61 extend outward from the casing sufficiently to intercept their respective disc arms when the disc is not in normal position. In the embodiment shown, the blocks 61 are cut away (L-shaped) to permit vertical passage of the disc 39. If, as an example, the gate assembly is being lowered in the casing and the disc 39 is oriented with its arm 53 below normal position, this arm is intercepted by the block 61 shown in FIG. 3. As a result, the disc is rotated to the position where both disc arms rest on the blocks 61. The disc 39 now is in position for transverse movement to close the valve. In the arrangement shown in FIG. 3, the vertical placement of the disc-arms is such that re-orientation of the disc is effected at virtually the same time that the spreaders 33, 35 contact the previously mentioned stops 43, 45. If desired, the spreader stop 45 can be eliminated, since the blocks 61 can serve both to orient the disc 39 and arrest downward movement of the downstream spreader-and-disc assembly.

In some operating environments, the gate assembly is subject to appreciable vibration. When the valve is in open position such vibration might cause the downstream disc 39 to rotate to a position where the disc arms 51, 53 would not be intercepted by the blocks 61 during closing of the valve. To prevent the disc from rotating to that position, the disc 39 is provided (see FIGS. 3 and 4) with a pair of spaced bosses 55 and 57, which are in confronting relation with the downstream spreader 35. In the embodiment shown, the bosses are provided on either side of the vertical centerline of the inner face of the disc and extend laterally on either side of the tongue 59. As indicated in FIG. 4, when the disc is in normal position--i.e., positioned with the arms 51, 53 substantially horizontal--the tongue 59 is separated laterally from either boss by a selected spacing. This spacing is provided to permit only a selected amount of angular displacement of the disc in either direction in response to rotational forces.

Referring to the spreader-and-disc assemblies, the connection between the spreaders and their respective valve discs can be of any suitable design permitting rotation of the discs. The connection can, if desired, be of the type illustrated in FIG. 5. As shown therein, the central extension 40 of the disc 39 is designed with a cylindrical end portion 63, which extends into a throughgoing aperture 65 in the spreader 35. A plate 67 is mounted to the end 63 and bears on a shoulder 69 of the spreader. If desired, the disc-to-spreader joint can be any suitable bearing-type connection.

In an alternative form of this invention, the bosses 55, 57 are provided on the downstream spreader 35, and the tongue 59 is provided on the downstream disc 39. The bosses and the tongue cooperate to limit angular displacement of the downstream disc, and it will be apparent that this function can be accomplished if the bosses and tongue are of various configurations and mounted in various positions on the downstream disc and spreader. The tongue may, for example, be in the form of a rearward projection which is carried by the disc 39 and which extends into an arcuate groove in the outer face of spreader 35, the end walls of the groove serving the function of the bosses 55, 57. Thus, it is within the scope of this invention to provide a tongue on one member of the downstream disc-and-spreader assembly and means on the other member for engaging the tongue to limit angular displacement of the disc.

It also will be apparent that the opposed disc-arms 51, 53 and the disc-arm blocks 61 may be of various configurations compatible with their above-described functions. If desired, the arms can be mounted on the rim of the disc 39, to extend in the plane of the disc. Sufficient spacing may be provided between the rim of the downstream disc and its sealing surface 41 for the arms to be mounted to the margin of the downstream face of the disc, outwardly of the sealing surface.

What is claimed is:

1. In a gate valve including an elongated casing enclosing opposed annular seating surfaces defining an upstream port and a downstream port, a gate assembly movable longitudinally in said casing, said assembly including a pair of valve discs having surfaces for engaging said seating surfaces to close said valve, a pair of spreaders rotatably supporting said discs, and a wedge slidably engaging and carrying said spreaders; means for longitudinally moving said assembly to a position where said discs are between and substantially aligned with said seating surfaces and for transversely moving the disc-and-spreader assemblies so positioned to close and open said ports; and upstream and downstream pairs of hold-down lugs in said member for respectively engaging the upstream and downstream disc-and-spreader assemblies to restrict sliding of said disc surfaces across said seating surfaces during opening of said valve; the improvement comprising:

a pair of oppositely disposed, laterally projecting arms carried by the downstream valve disc, for engagement with the downstream pair of said hold-down lugs during transverse movement of said downstream disc to said position, whereby longitudinal movement of said gate assembly when only one of said arms has disengaged from its hold-down lug effects angular displacement of said downstream disc.

2. The combination of claim 1 wherein said arms extend outwardly from a margin of said downstream disc.

3. The combination of claim 1 wherein said arms extend in the plane of said downstream disc.

4. The combination of claim 1 wherein oppositely disposed stops are provided in said casing for intercepting said arms as said gate assembly is moved longitudinally into said position.

5. The combination of claim 4 wherein said stops have flat surfaces for supporting and guiding said arms during transverse movement of said downstream disc-and-spreader assembly.

6. The combination of claim 1 further including a tongue carried by one of the downstream disc and the downstream spreader, and means carried by the other of said downstream disc and downstream spreader for engaging said tongue to limit angular displacement of said downstream disc.

7. The combination of claim 6 wherein said means comprises a pair of spaced bosses.

* * * * *